United States Patent
Bond et al.

(10) Patent No.: US 10,406,841 B2
(45) Date of Patent: Sep. 10, 2019

(54) PRINTING APPARATUS

(71) Applicant: Dover Europe Sárl, Vernier (CH)

(72) Inventors: Nicky Bond, Lowdham (GB);
Mohammed Jamal Toudmeri, Birmingham (GB)

(73) Assignee: Dover Europe Sarl, Vernier (CH)

( * ) Notice: Subject to any disclaimer, the term of this patent is extended or adjusted under 35 U.S.C. 154(b) by 0 days.

(21) Appl. No.: 15/889,134

(22) Filed: Feb. 5, 2018

(65) Prior Publication Data

US 2018/0222233 A1    Aug. 9, 2018

(30) Foreign Application Priority Data

Feb. 6, 2017    (GB) .................................. 1701909.2

(51) Int. Cl.
*B41J 35/36* (2006.01)
*B41J 35/00* (2006.01)
(Continued)

(52) U.S. Cl.
CPC .............. *B41J 35/00* (2013.01); *B41J 2/325* (2013.01); *B41J 17/36* (2013.01); *B41J 25/308* (2013.01); *B41J 33/34* (2013.01); *B41J 35/36* (2013.01); *B41M 5/38264* (2013.01); *G06K 15/028* (2013.01)

(58) Field of Classification Search
CPC ...... B41J 25/308; B41J 25/3088; B41J 2/315; B41J 17/32; B41J 2/17546; B41J 2/325; B41J 33/34; B41J 35/00; G06K 15/028
See application file for complete search history.

(56) References Cited

U.S. PATENT DOCUMENTS

| 4,034,935 A | 7/1977 | Plaza et al. |
| 4,350,451 A | 9/1982 | Furrow |

(Continued)

FOREIGN PATENT DOCUMENTS

| CN | 205523128 A1 | 8/2016 |
| EP | 979736 A1 | 2/2000 |

(Continued)

OTHER PUBLICATIONS

Translation of CN 205523128U, published on Aug. 2016 (Year: 2016).*

(Continued)

*Primary Examiner* — Huan H Tran
(74) *Attorney, Agent, or Firm* — Fish & Richardson P.C.

(57) ABSTRACT

In accordance with at least one aspect of the present disclosure, a printing apparatus includes: a housing including at least one removable portion, a pair of spool supports which are rotatably drivable by at least one motor, a supply spool, a take-up spool, each spool being receivable on a respective spool support, such that, in use, a ribbon extends along a ribbon path between the supply spool and the take-up spool, a ribbon identification system comprising: a tag for storing information concerning a property of the ribbon, a reader, wherein the tag is attached to one of the supply and take-up spools and the reader is attached to the removable portion or one of the removable portions, and wherein a signal emitted by the tag and received by the reader allows the reader to identify a property of the ribbon.

11 Claims, 12 Drawing Sheets

(51) Int. Cl.
*B41J 17/36* (2006.01)
*B41J 2/325* (2006.01)
*B41J 25/308* (2006.01)
*B41J 33/34* (2006.01)
*B41M 5/382* (2006.01)
*G06K 15/02* (2006.01)

(56) References Cited

U.S. PATENT DOCUMENTS

| | | | |
|---|---|---|---|
| 4,725,155 | A | 2/1988 | Kittel et al. |
| 4,909,647 | A | 3/1990 | Schulte et al. |
| 5,172,987 | A | 12/1992 | Stellmach et al. |
| 5,181,465 | A | 1/1993 | Fitzgibbons et al. |
| 5,344,248 | A | 9/1994 | Schoon et al. |
| 5,995,128 | A | 11/1999 | Adams et al. |
| 6,315,469 | B1 | 11/2001 | Alvarez et al. |
| 7,342,597 | B2 * | 3/2008 | Squires ............ B41J 35/36 347/214 |
| 2002/0012558 | A1 | 1/2002 | Huss et al. |
| 2004/0136768 | A1 | 7/2004 | Klinefelter et al. |
| 2004/0138768 | A1 * | 7/2004 | Murray ............ G09B 25/00 700/90 |
| 2006/0007296 | A1 | 1/2006 | Bouverie et al. |
| 2012/0086763 | A1 | 4/2012 | McNestry et al. |
| 2012/0327153 | A1 | 12/2012 | Bouverie et al. |
| 2013/0118369 | A1 | 5/2013 | Chu |
| 2014/0063171 | A1 | 3/2014 | McNestry et al. |
| 2016/0243865 | A1 | 8/2016 | Kohyama |
| 2017/0136795 | A1 * | 5/2017 | Paulson ............ B41J 33/16 |

FOREIGN PATENT DOCUMENTS

| | | |
|---|---|---|
| FR | 2736863 A1 | 1/1997 |
| GB | 1416295 A1 | 12/1975 |
| GB | 2333266 A | 7/1999 |
| JP | H01130965 A | 5/1989 |
| JP | 2000033756 A1 | 2/2000 |
| JP | 03139749 U | 2/2008 |

OTHER PUBLICATIONS

Application No. GB1701909.2, Search Report under Section 17(5), dated Jul. 20, 2017, 5 pages.
European Application No. GB1701909.2, Further Search Report under Section 17 dated Apr. 10, 2018, 8 pages.
European Application No. EP 18 15 4994, European Search Report dated Jun. 28, 2018, 4 pages.

* cited by examiner

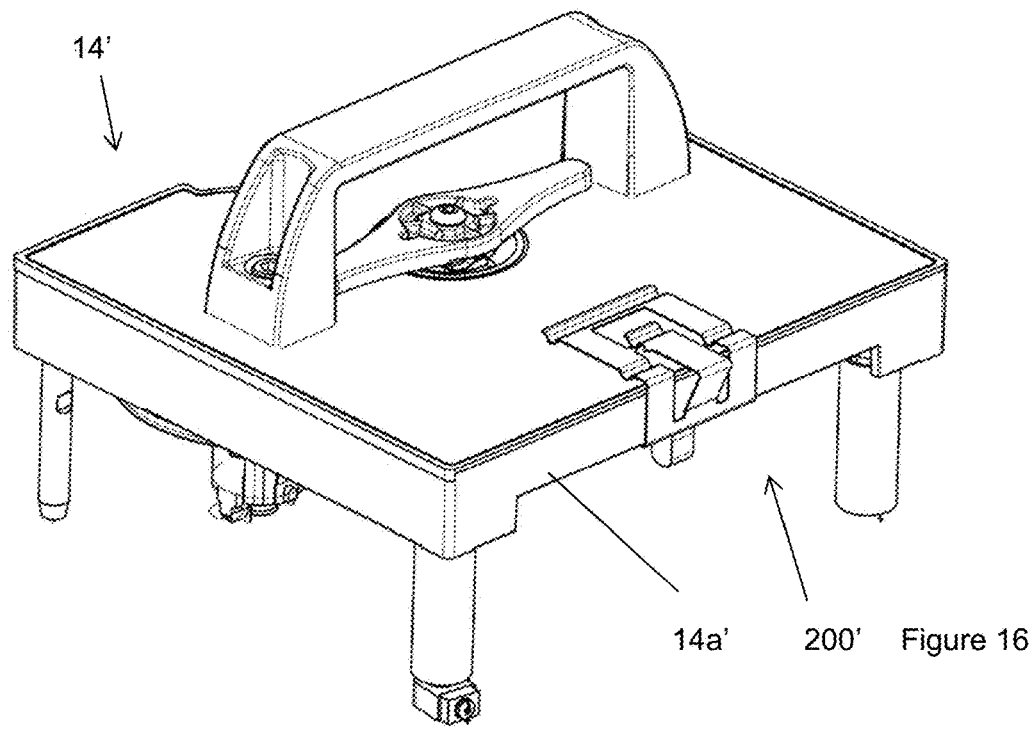
14a'  200'  Figure 16
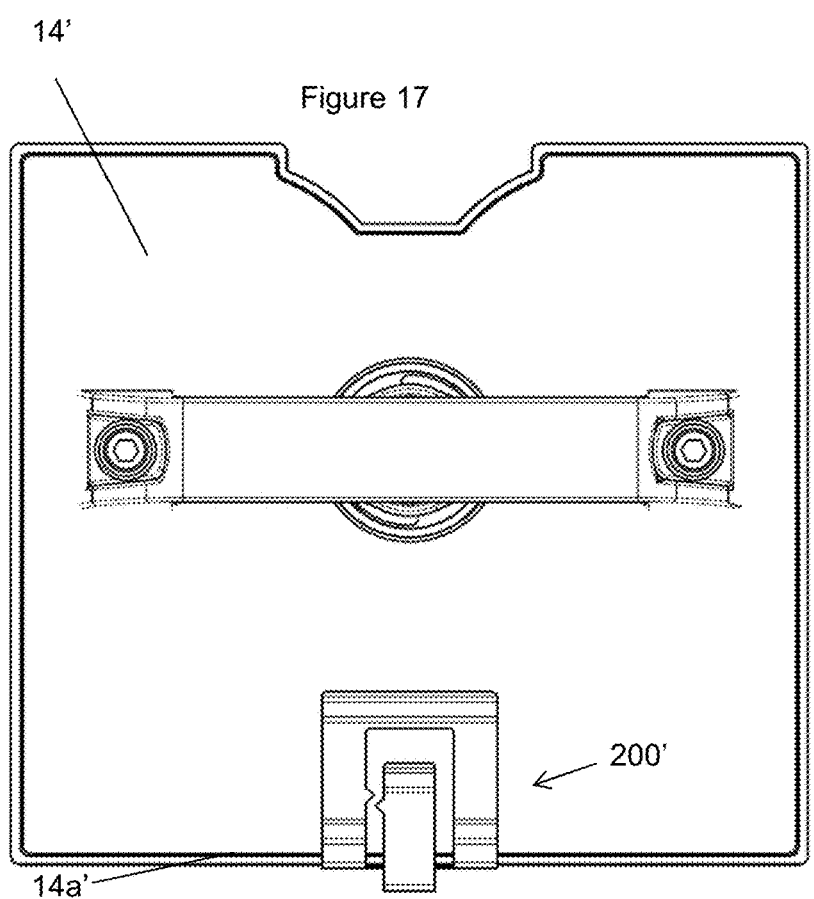

PRINTING APPARATUS

BACKGROUND

Embodiments of the present invention relate to printing apparatus and to printing systems.

Thermal transfer printing apparatus, such as thermal transfer overprinters (TTOs), are well known. Thermal transfer printing apparatus typically use a ribbon (aka tape) coated with a layer of ink, to transport the ink required for a printing operation. A printhead presses the inked ribbon against a target printing substrate before heating elements within the printhead are activated to melt the ink on the ribbon and cause its transfer to the target substrate. As the printhead and the substrate are moved relative to one another selected printhead heating elements are activated to create a desired image on the substrate.

It is known to provide thermal transfer printing apparatus in two different operational configurations. In the first, so called "intermittent", configuration the substrate to be printed and the ribbon are held stationary during a printing operation, whilst the printhead is moved across the surface of the substrate.

At the start of a printing operation the printhead moves towards a support (typically a flat platen) with the ribbon and substrate sandwiched therebetween. The printhead is then moved across the platen and whilst doing so ink from the ribbon is transferred to the substrate. Once the printing operation is complete, the printhead is lifted away from the platen and returned to its start position, whilst the ribbon and substrate are advanced in anticipation of the next printing operation.

In the second, so called "continuous" configuration, the substrate to be printed moves substantially continuously past a printing point.

The ribbon is accelerated to match the speed of the substrate before the printhead is moved towards a support (typically a roller) with the ribbon and substrate sandwiched therebetween. As the printhead presses the ribbon against the substrate a printing operation is carried out which causes transfer of ink from the ribbon to the substrate.

FIG. 1 is a schematic diagram of a prior art thermal transfer overprinter 10. The TTO 10 is typically formed of two main component parts: a cassette and a casing. The cassette supports supply and take-up spools 2, 3 and the casing houses components of the TTO 10. A ribbon 5 is fed from the supply spool 2 to the take up (or waste) spool 3. The ribbon 5 is guided between the spools by fixed rollers 1 past a printhead 4. A target substrate 7 passes over a platen 6. The printhead 4 can move to press the moving ribbon against the target substrate 7.

It is well known in the industry to use a cassette to support the ribbon spools 2, 3. The mechanical precision of the cassette is intrinsic to the smooth operation of the printer. The spools have to be held parallel and aligned to each other and any intervening rollers 1. This ensures that the ribbon 5 passes accurately from the supply spool 2 to the take-up spool 3, for example without creasing or wrinkling.

The TTO 10 also includes the casing which accommodates components such as one or more motors for rotatably driving the spools 2, 3, the printhead 4, one or more printed circuit boards and the like. In all known instances, the casing and cassette are machined from tool grade aluminium.

SUMMARY

Embodiments of the present invention seek to alleviate one or more problems associated with the prior art, as discussed herein, including reducing the expense of manufacture of traditional TTO casings and cassettes.

According to a first aspect of the invention we provide a component part of a printing apparatus of the type including a supply spool support for supporting a supply spool and a take-up spool support for supporting a take-up spool, the supply spool support and take-up spool support being drivable by at least one motor, the component part comprising:
  a cast housing having a wall which defines an enclosure for at least partially accommodating at least one motor, wherein the wall has a substantially constant thickness.

According to a second aspect of the invention we provide component part of a printing apparatus, the component part comprising:
  a cast base having a substantially planar surface;
  a supply spool support for supporting a supply spool and a take-up spool support for supporting a take-up spool, the supply spool support and the take-up spool support being connected to the cast base,
wherein the cast base includes a plurality of rib formations provided across the substantially planar surface.

According to a third aspect of the present invention we provide a method of manufacturing a component part of a printing apparatus of the type including a supply spool support for supporting a supply spool and a take-up spool support for supporting a take-up spool, which method includes a step of casting a housing and/or a base.

Known thermal transfer overprinters typically have a voltage input port provided in the casing which is configured to receive low voltage electricity (typically of the order of 24 V (direct current)) from a remote power supply via a cable having a relatively large cross-sectional area. Such thermal transfer overprinters inherently produce large current spikes, for instance across their voltage input ports. A cable having a relatively large cross-sectional area is therefore required in order to suppress these spikes.

A disadvantage with the prior art arrangement is that it is bulky, in that there are at least two separate components, i.e. the thermal transfer overprinter and the remote power supply, which should be positioned appropriately for operation.

According to a fourth aspect of the invention we provide a printing apparatus comprising:
  a supply spool support for supporting a supply spool and a take-up spool support for supporting a take-up spool, the supply spool support and the take-up spool support being drivable by at least one motor;
  a housing defining an enclosure; and
  a device having an input for receiving an input voltage and an output for delivering an output voltage to the or each motor, the output voltage being lower than the input voltage,
wherein the device is located within the enclosure.

Printing systems typically include the printing apparatus and a ribbon identification system, so that properties of the ribbon may be identified by the printing apparatus. Known ribbon identification systems may include an RFID system in which a reader and a tag are used to communicate the properties concerning the ribbon from a spool to the printing apparatus.

It is a further object of the present invention to seek to improve the effectiveness of a printing system.

According to a fifth aspect of the invention we provide a printing system comprising a printing apparatus and a ribbon identification system,
  the printing apparatus comprising:
    a housing which includes at least one removable portion, a pair of spool supports which are rotatably drivable by at least one motor,
a supply spool, upon which ribbon is initially wound,
a take-up spool, for receiving ribbon unwound from the supply spool, each spool being receivable on a respective spool support, such that, in use, the ribbon extends along a ribbon path between the supply spool and the take-up spool,
the ribbon identification system comprising:
a tag for storing information concerning a property of the ribbon,
a reader,
wherein the tag is attached to one of the supply and take-up spools and the reader is attached to the removable portion or one of the removable portions, and wherein a signal emitted by the tag and received by the reader allows the reader to identify a property of the ribbon.

It is a further object of the present invention to provide a mechanism for accurately setting a predetermined distance between a printing apparatus and a surface.

According to a sixth aspect of the present invention we provide a tool for setting a predetermined distance between a printing apparatus and a surface, the tool comprising:
a first part;
a second part for contacting a surface; and
an indicator assembly for indicating when a predetermined distance between a printing apparatus and a surface has been set,
wherein, in use, the second part is configured to move relative to the first part such that the indicator assembly indicates when the predetermined distance has been set.

According to a seventh aspect of the present invention we provide a method of fixing a printing apparatus relative to a surface using a tool in accordance with the sixth aspect of the invention; wherein the method includes the steps of:
attaching or contacting the first part of the tool to the printing apparatus,
moving the printing apparatus towards the surface until the second part of the tool contacts the surface and the indicator assembly indicates that the printing apparatus is set a predetermined distance from the surface, and
fixing the printing apparatus in position relative to the surface.

Further optional features of the present invention are recited in the claims appended to the description below.

BRIEF DESCRIPTION OF THE DRAWINGS

Some embodiments of the invention are illustrated in the attached figures, of which:

FIG. 16 shows the tool in-situ in accordance with some embodiments;

FIG. 17 is a front view of FIG. 16; and

DETAILED DESCRIPTION

The figures show a thermal transfer printing apparatus 10', which may be a thermal transfer overprinter (TTO). The printing apparatus 10' includes a ribbon 5' which is initially wound around a supply spool 2'. The ribbon 5' extends between the supply spool 2' and a take-up spool 3'. The take-up spool 3' takes waste ribbon 5' during operation of the printing apparatus 10' (i.e. the ribbon 5' is wound onto the take-up spool 3'). A part of the ribbon 5' is located adjacent a printhead 4'. A substrate onto which images are to be printed is supported by a surface (e.g. a platen or a roller), so that the ribbon 5' and the substrate are located between the surface and the printhead 4'. During a printing cycle, the printhead 4' is lowered towards the surface and heating elements (not shown) are heated so as to transfer ink from the ribbon 5' onto the substrate.

The printing apparatus 10' comprises first and second component parts 12', 14', known respectively in the art as a casing and a cassette.

Figure 1:
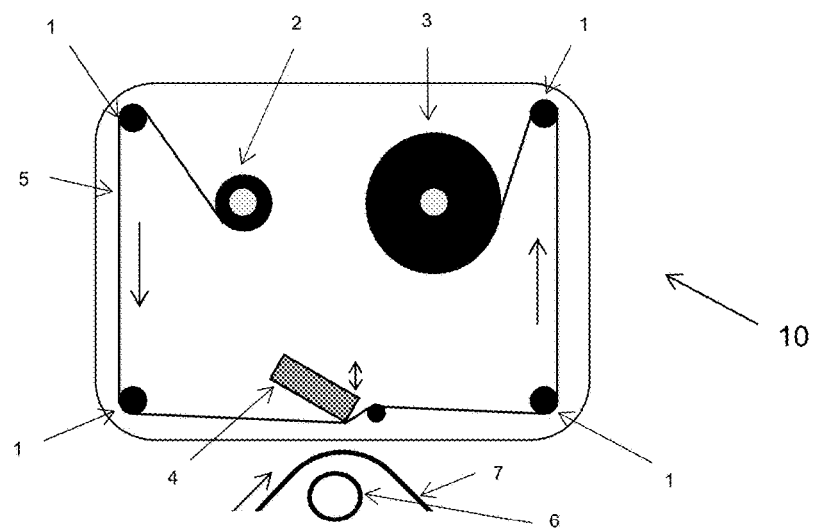
FIG. 1 is a schematic diagram of a prior art thermal transfer overprinter.
Figure 2:
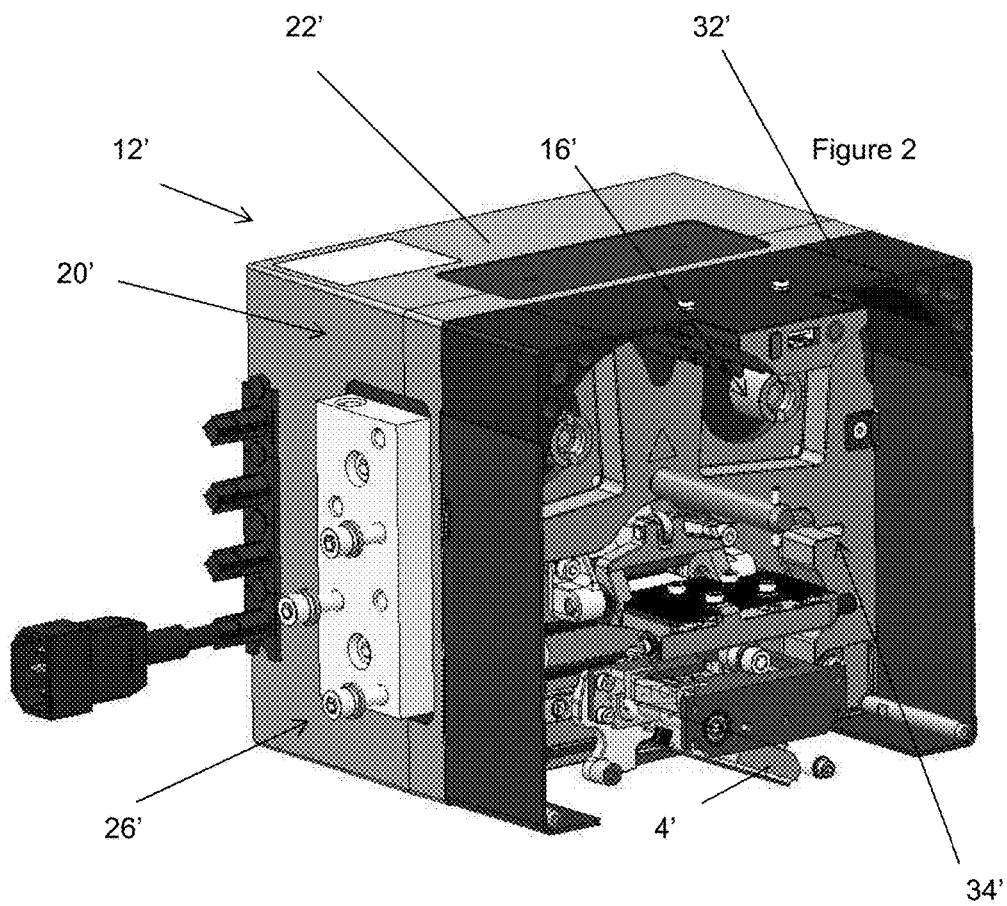
FIG. 2 is a perspective view of a component part of a printing apparatus in accordance with some embodiments of the invention.

The first component part 12' (i.e. the casing) is shown, for example, in FIG. 2. The first component part 12' may house one or more motors 16', the printhead 4', a device 70' (shown in FIG. 8) which can provide power to the motors 16$a'$, 16$b'$ and the printhead 4', and a printed circuit board (not shown). It should be appreciated that the first component part 12' may house additional components.

Figure 3:
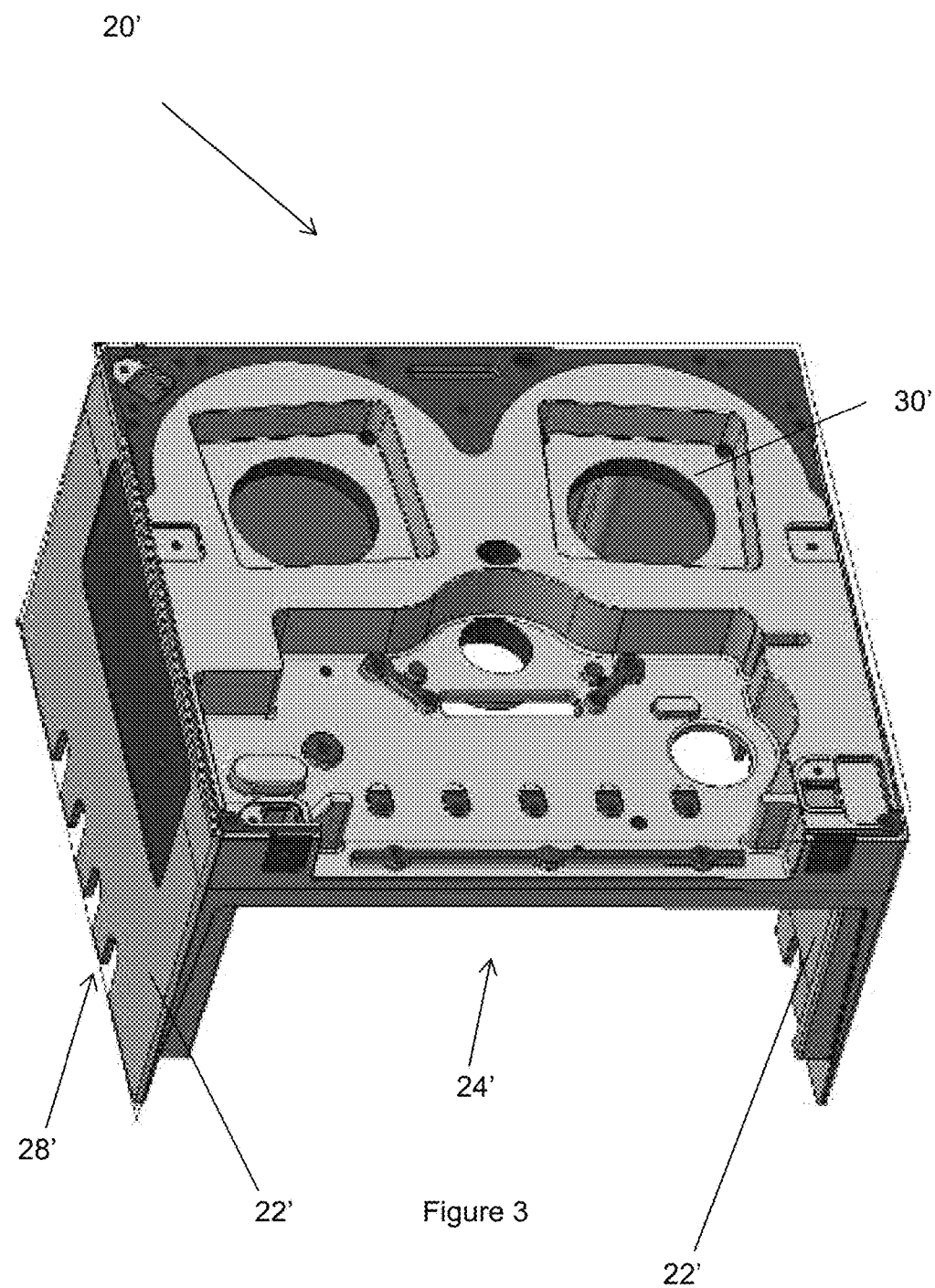
FIG. 3 is a perspective view of a cast housing according to some embodiments.
Figure 4:
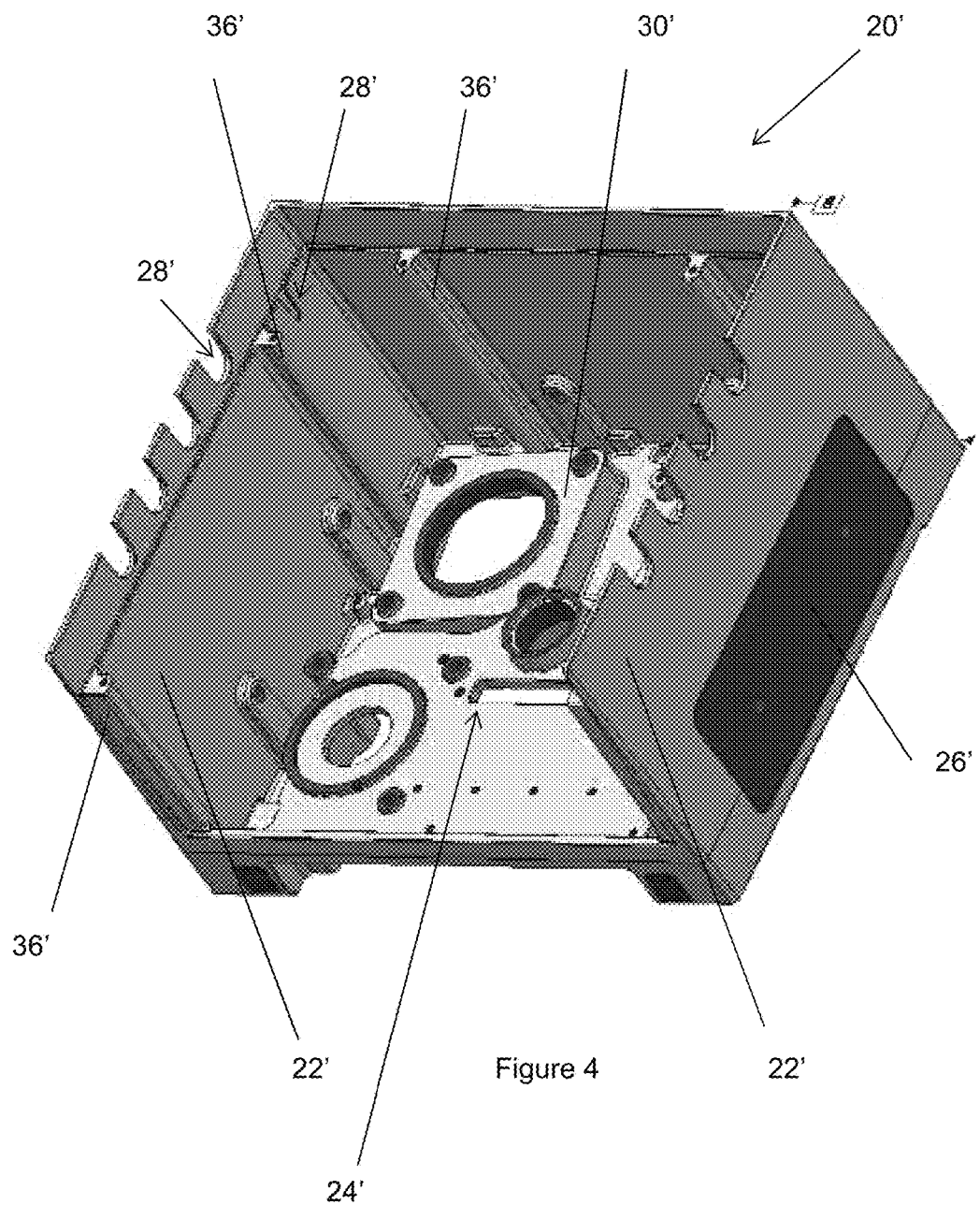
FIG. 4 is another perspective view of the cast housing of FIG. 3.

The first component part 12' includes a housing 20' that is formed by casting. The housing 20' is shown in FIGS. 3 and 4. The housing 20' includes a wall 22' which defines an enclosure 24' for at least partially accommodating at least one motor 16'. The wall 22' of the cast housing 20' has a substantially constant thickness. In some embodiments, the wall 22' has a thickness of below approximately 5 mm (the wall 22' may have a thickness of approximately 4 mm).

In the past it has not been possible to manufacture appropriate housings 20' by casting because the resultant product has been insufficiently strong and insufficiently rigid to form part of a printing apparatus 10'. In previous tests the housing 20' has distorted during the casting process making it unsuitable for use. Surprisingly, the inventors have found that by ensuring that the wall 22' of the cast housing 20' has a substantially constant thickness stresses can be minimised during cooling of the cast metal or alloy which prevents distortion of the housing 20', thereby resulting in the housing 20' (and hence the first component part 12') having sufficient strength and sufficient rigidity to function as a part of a printing apparatus 10'. This produces a very effective and cost efficient design, when compared to a machined equivalent of the prior art.

In some embodiments, the housing 20' is manufactured by casting aluminium or an aluminium alloy. This unique method of forming the housing 20' also reduces the number of components that need to be assembled to form the printing apparatus 10'. For instance, the casting process incorporates assembly aids (e.g. apertures/rebates for receiving other component parts) at no additional cost, thereby removing the need for special assembly jigs. The housing 20' requires minimal machining in order to incorporate the other component parts. Thus, the housing 20' has an effect of easing product assembly, maintenance and repair.

In some embodiments, the housing 20' may have a mounting arrangement 26' located on a side of the housing 20' for mounting the first component part 12' to a structure. The mounting arrangement 26' may itself be partially formed by machining. In some embodiments, the mounting arrangement 26' may be at least partially located in a rebate or opening of the housing 20'. The mounting arrangement 26' is for mounting the first component part 12' of the printing apparatus 10' to the remainder of a printing machine (not shown). The housing 20' may also define one or more passageways 28' for receiving cabling and one or more raised formations 30' for supporting and/or receiving the or each motor 16' (see particularly FIG. 4 which illustrates two raised formations 30' for supporting and/or receiving a motor 16' for driving each of the supply and take-up spools 2', 3'). In some embodiments, the first component part 12' includes a collar 32' which defines an opening 34' for receiving the supply spool 2' and the take-up spool 3' supported on a cassette 14' by respective supply spool and take-up spool supports 50', 52'. The collar 32' may be located adjacent the wall 22' (as shown in FIG. 2).

In some embodiments, the wall 22' of the housing 20' may include at least one rib formation 36' provided across a surface thereof. Advantageously, the or each rib formation 36' provides the housing 20' (and hence the first component part 12') with additional strength and rigidity. The rib formations 36' may reduce distortion when compared to a component part without having rib formations 36'.

Figure 5:
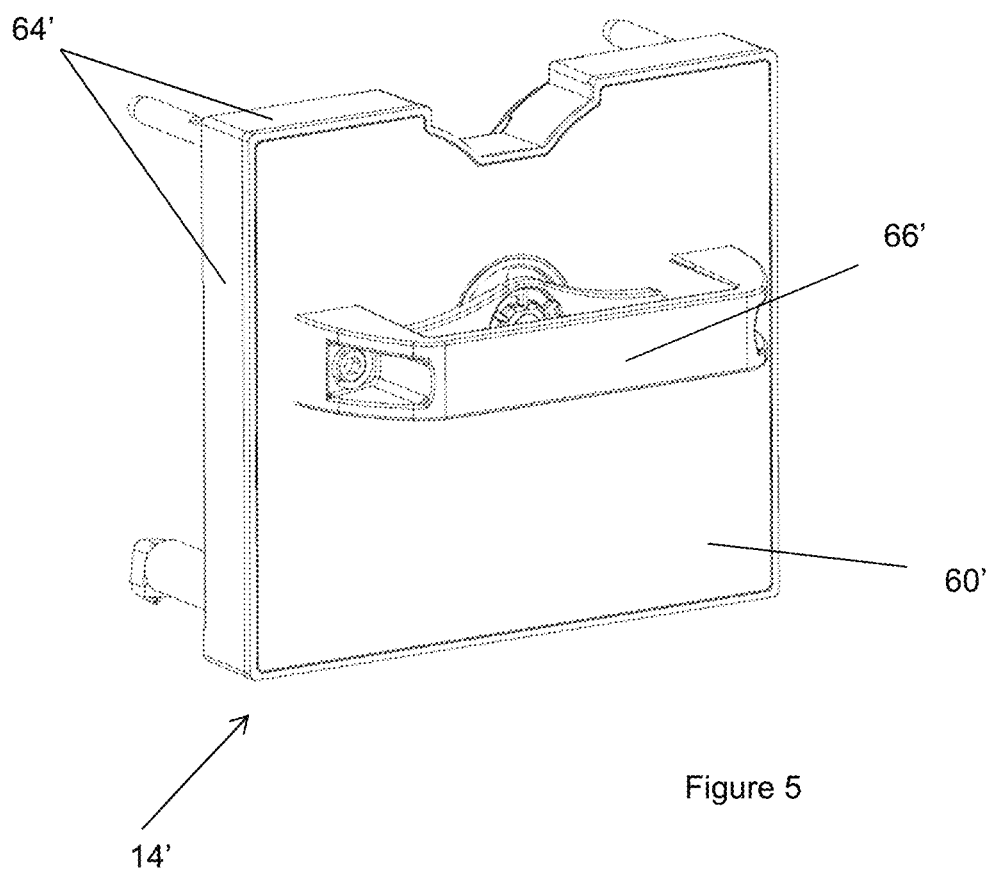
FIG. 5 is a perspective view of a cassette in accordance with some embodiments.
Figure 6:
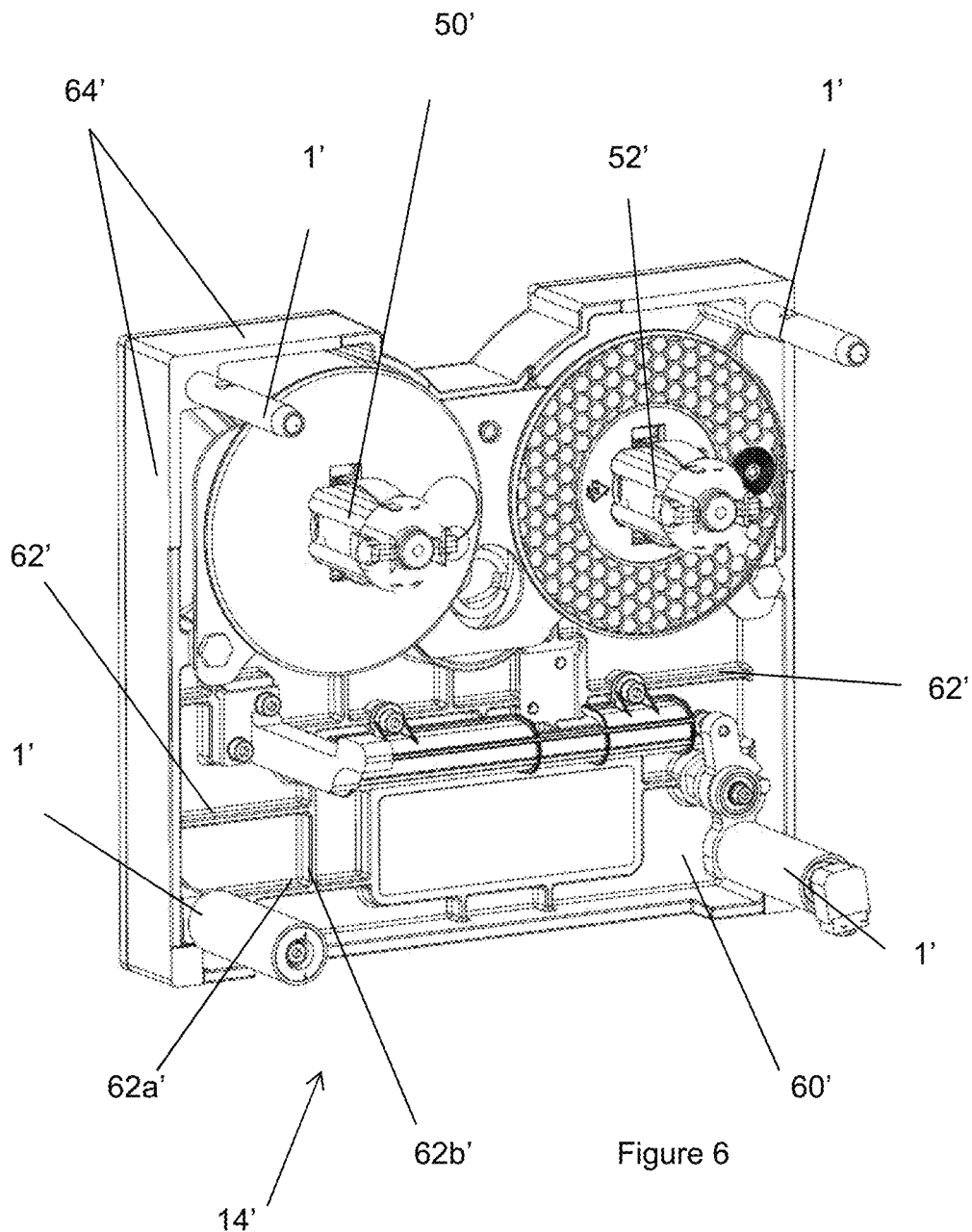
FIG. 6 is another perspective view of the cassette of FIG. 5.

The second component part 14' (i.e. the cassette) is shown, for example, in FIGS. 5 and 6. The second component part 14' is removable from the first component part 12' and supports the supply and take-up spools 2', 3' (and hence the ribbon 5'). The supply and take-up spools 2', 3' are mounted on respective spool supports 50', 52' (e.g. there is a supply spool support 50' and a take-up spool support 52'). However, it should be appreciated that the printing apparatus 10' may be 'reversible' and as such the supply and take-up spools 2', 3' and supports 50', 52' maybe be reversed (i.e. the supply spool 2' and support 50' may become the take-up spool and support when the printing apparatus 10' is reversed and the ribbon 5' travels in the opposite direction).

The second component part 14' includes a base 60' that is formed by casting. The base 60' has a substantially planar surface. The supply spool support 50' and take-up spool support 52' are connected to the base 60'. The base 60' includes a plurality of rib formations 62' provided across the substantially planar surface.

In some embodiments, the second component part 14' may include an upstanding wall portion 64' which extends around a perimeter of the base 60'.

In some embodiments, the upstanding wall portion 64' may be formed by casting. In some embodiments, the upstanding wall portion 64' may be formed integrally with the base 60'. For instance, the upstanding wall portion 64' and the base 60' may be formed as a unitary cast. In some embodiments, the base 60' and/or the upstanding wall portion 64' may have a substantially constant thickness. In some embodiments, the base 60' and/or the upstanding wall portion 64' may have a thickness of below approximately 5 mm (for example, the average thickness may be approximately 4 mm). In some embodiments, the upstanding wall portion 64' may have a depth of approximately 2.5 cm (although it should be appreciated that the depth may be more or less than 2.5 cm). In some embodiments, the second component part 14' may include a handle 66' for gripping by a user. The handle 66' may be provided on the base 60', for example.

In some embodiments, the base 60' may be manufactured by casting aluminium or an aluminium alloy. The rib formations 62' provide the base 60' (and hence the second component part 14') with sufficient strength and sufficient rigidity to provide the necessary foundation for the supply spool 50', the take-up spool support 52' and rollers 1'. The second component part 14' has the advantage of being cheap to manufacture, when compared to a machined cassette of the prior art.

In embodiments which include the upstanding wall portion 64' the second component part 14' is provided with additional strength and additional rigidity.

Surprisingly, the inventors have found that by ensuring that the base 60' and the upstanding wall portion 64' (where present) are cast having a substantially constant thickness stresses can be minimised during cooling of the cast metal or alloy which results in the second component part 14' maintaining its shape over time. It will be appreciated that by maintaining the shape of the component part 14' over time the ribbon 5' remains accurately aligned as it passes between the supply and take-up spools 2', 3', thereby minimising twisting and/or creasing of the ribbon 5'.

In some embodiments, the rib formations 62a', 62b' may be disposed substantially transversely (e.g. perpendicularly) with respect to one another across the substantially planar surface of the base 60'. Creating such a network of rib formations 62a', 62b' provides the second component part 14' with additional strength and additional rigidity.

Figure 7:
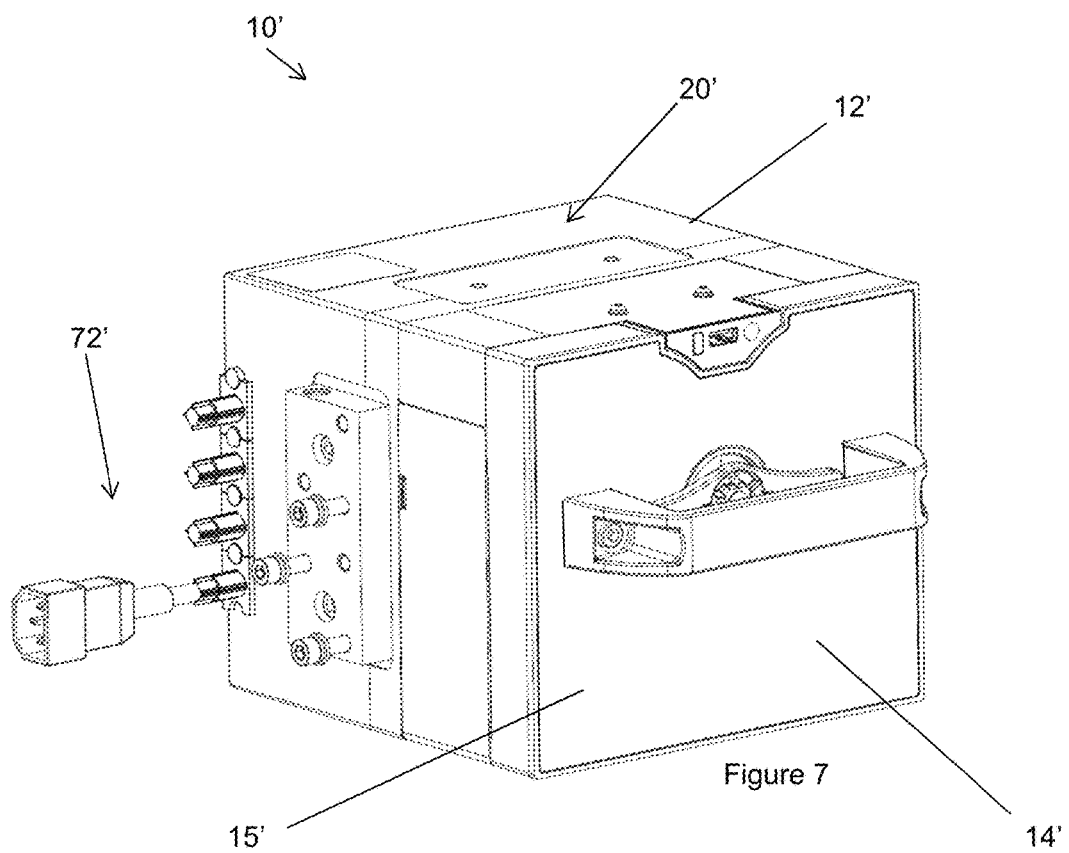
FIG. 7 is perspective view of a printing apparatus in accordance with some embodiments.
Figure 8:
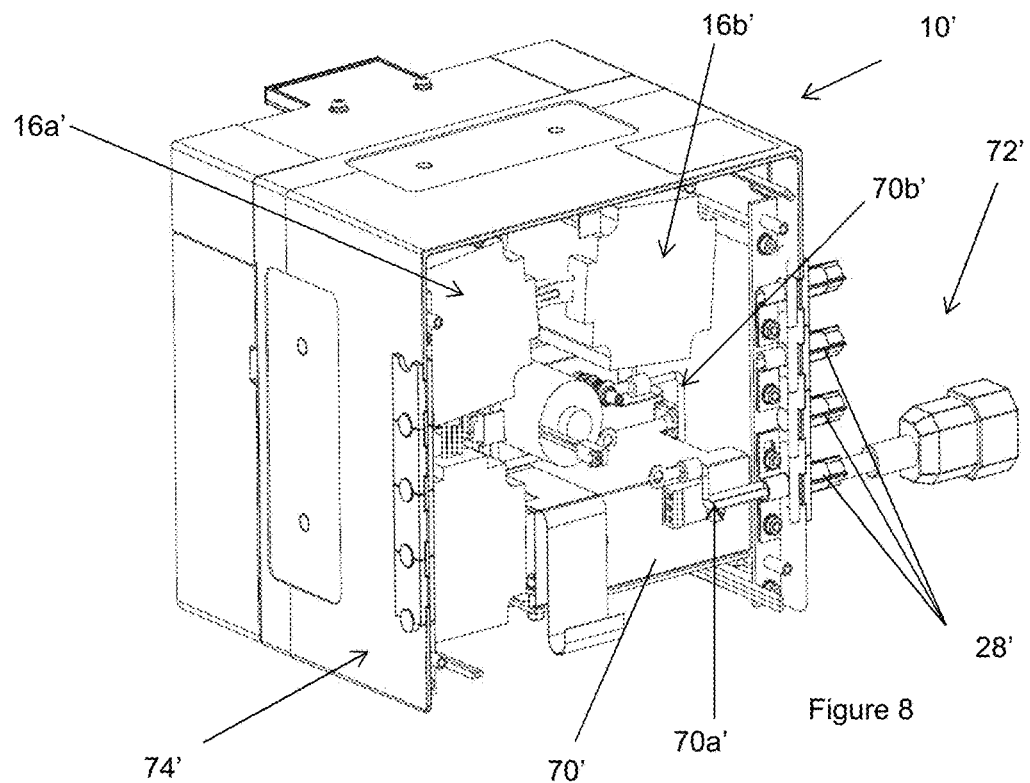
FIG. 8 is a perspective view of the printing apparatus of FIG. 7 shown with the cassette and rear cover removed.
Figure 9:
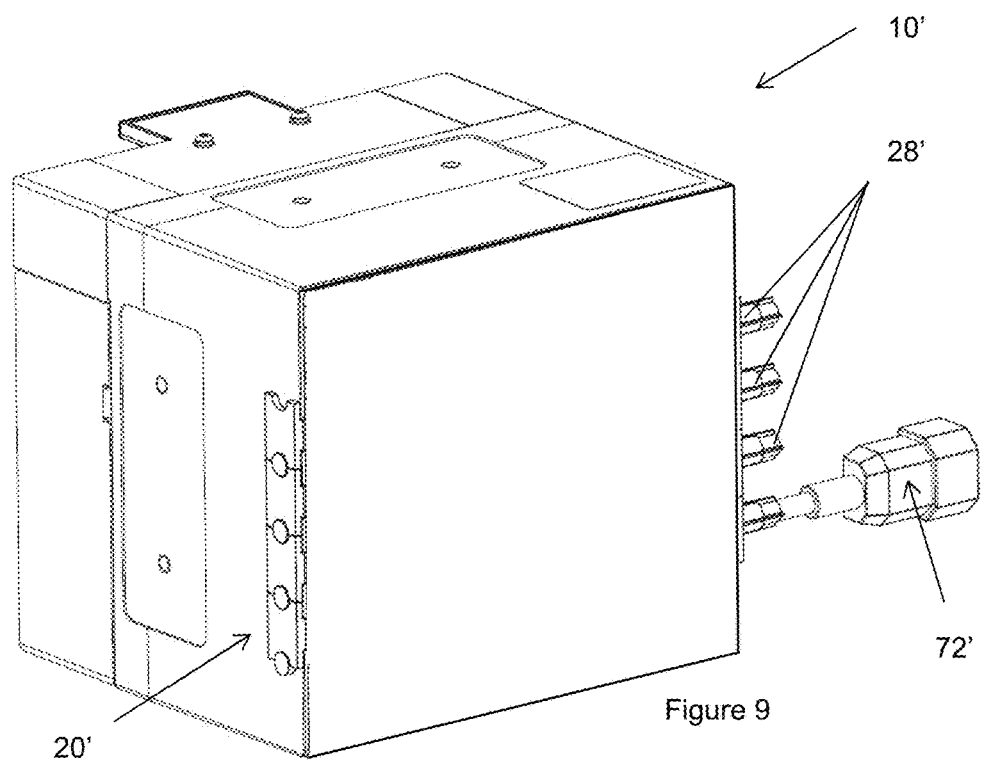
FIG. 9 is a perspective view of the printing apparatus of FIG. 7 shown with the cassette removed.

FIG. 7 shows an embodiment of the printing apparatus 10' according to some embodiments of the invention, including the first and second component parts 12', 14'. Views with parts removed are also shown in FIGS. 8 and 9.

As discussed above, the first component part 12' (i.e. the casing) of the printing apparatus 10' houses the motor 16' and coupling configured to drive a supply spool support 50' located on the second component part 14' and a motor 16' and coupling configured to drive a take-up spool support 52' located on the second component part 14'. The first component part 12' further includes a device 70' having an input 70a' for receiving an input voltage and an output 70b' for delivering an output voltage to the or each motor 16' and also to the printhead 4'. The output voltage is lower than the input voltage. The device 70' is located within the enclosure 24'.

In some embodiments, at least a portion of the or each motor 16' may be located within the enclosure 24'.

In some embodiments, the device 70' may be a power supply including at least one of a transformer, a rectifier and an active switch device. The device 70' may include an efficient active power switch device to minimise heat generation (and, as such, the device 70' may not include a transformer).

The present invention can result in a compact arrangement, whereby the device 70' is contained inside the housing 20'. A further advantage of some implementations of the present invention is that the printing apparatus 10' is no longer required to compensate for the voltage drop between a remote power supply and the printing apparatus 10', since power is supplied directly to the device 70' from an external source, e.g. mains electricity.

In some embodiments, the first component part 12' and/or the second component part 14' may include a heat sink for dissipating heat away from the device 70'. In some embodiments, the heat sink may be one or both of the housing 20' and base 60'.

Such improvements in the design of the housing 20' and base 60' (as described above) mean that the housing 20' and/or base 60' may act efficiently as a heat sink. As the housing 20' and/or base 60' may act efficiently as a heat sink, it is possible to directly supply mains electricity (having a voltage of circa 90 V (alternating current) to 240 V (alternating current)) to the printing apparatus 10' via a mains inlet 72' without the need for a remote power supply. The power supply (i.e. device 70') can instead be located inside the housing 20'. The device 70' typically reduces the voltage of mains electricity to a usable voltage (of the order of 24 V (direct current)).

As mentioned above, in some embodiments, the housing 20' may define one or more passageways 28' for receiving one or more respective cables. In some embodiments, a selected one of the cables may be configured to supply the input voltage to the device 70' from an energy source, e.g. the mains, via inlet 72'. A cover 74' is provided to extend over the back of the first component part 12' of the printing apparatus 10' to protect the components housed within.

In some embodiments, one or more of the cables may be configured to electrically communicate with respective component part(s) of a printing system. Component parts of a printing system may include any of a user interface and a programming device.

Further advantages include that a packaging machine manufacturer only has to find space for the actual printing apparatus 10' (and not the power supply), making the described printing apparatus 10' more attractive than known alternatives. The housing 20' also provides a secure mounting for the device 70' and an efficient heat management path due to its ability to absorb heat. Additionally, the housing 20' provides passageways 28' for cabling which can allow the mains voltage to be fed safely into the enclosure.

A printing system comprising the printing apparatus 10' and a ribbon identification system will now be described with reference to FIGS. 10 to 13. The first component part 12' may include at least one removable portion (described in detail further below).

Ribbon 5' is spooled onto the supply spool 2'. In use, the ribbon 5' extends along a ribbon path between the supply spool 2' and the take-up spool 3' (as illustrated by FIG. 12).

Figure 10:
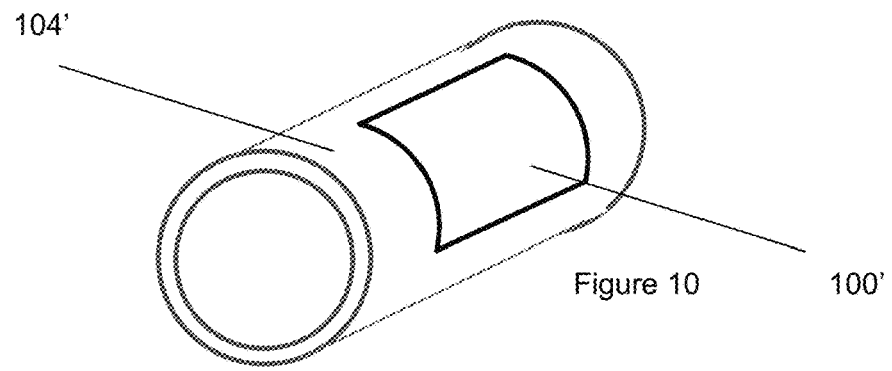
FIG. 10 is perspective view of a ribbon core in accordance with some embodiments.

Referring to FIG. 10, the ribbon identification system comprises a tag 100', e.g. an RFID tag.

Figure 11:
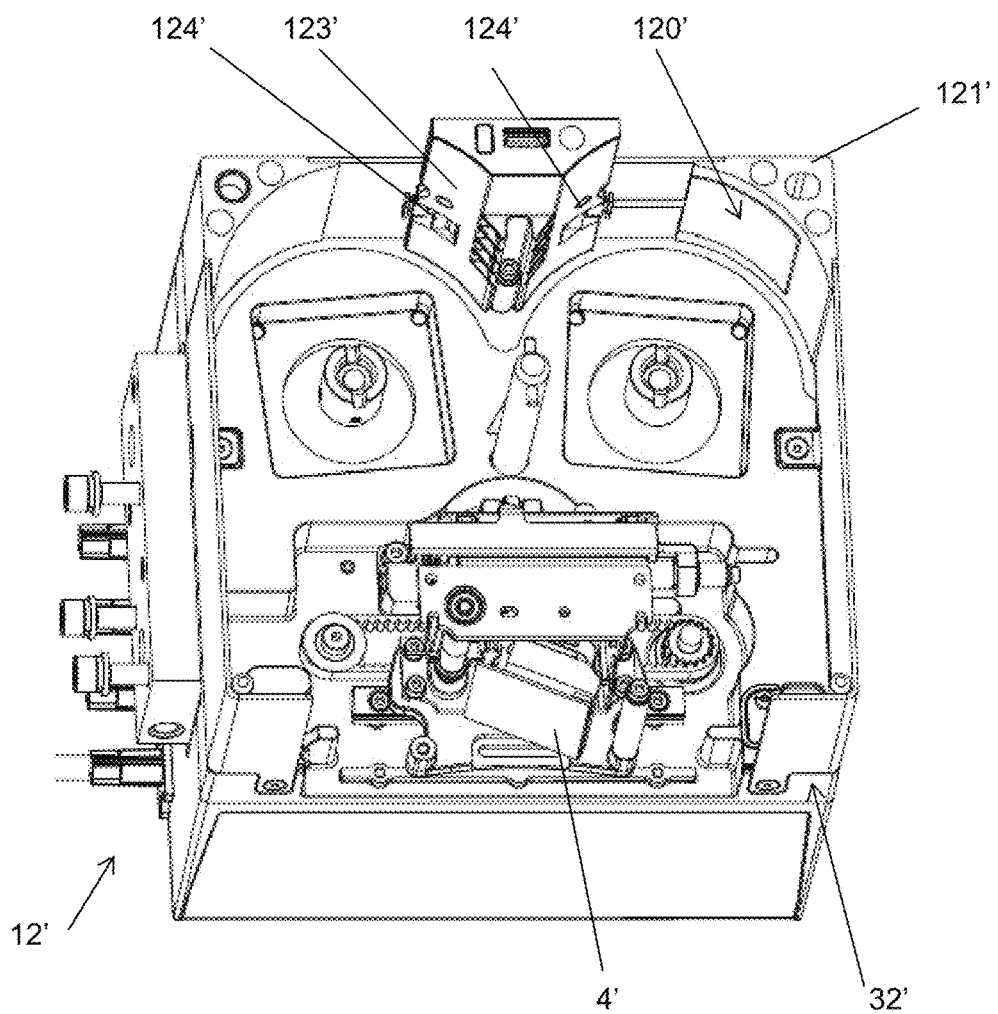
FIG. 11 is a perspective view of a printing apparatus shown with the cassette removed.
Figure 12:
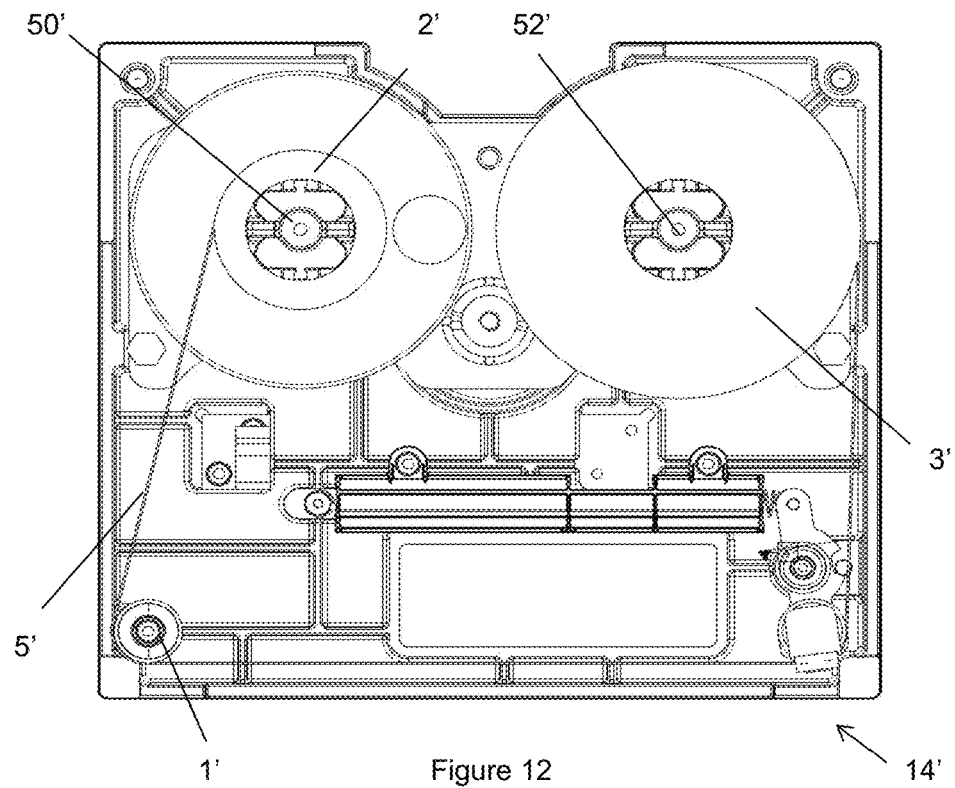
FIG. 12 is a front view of a cassette in accordance with some embodiments.
Figure 13:
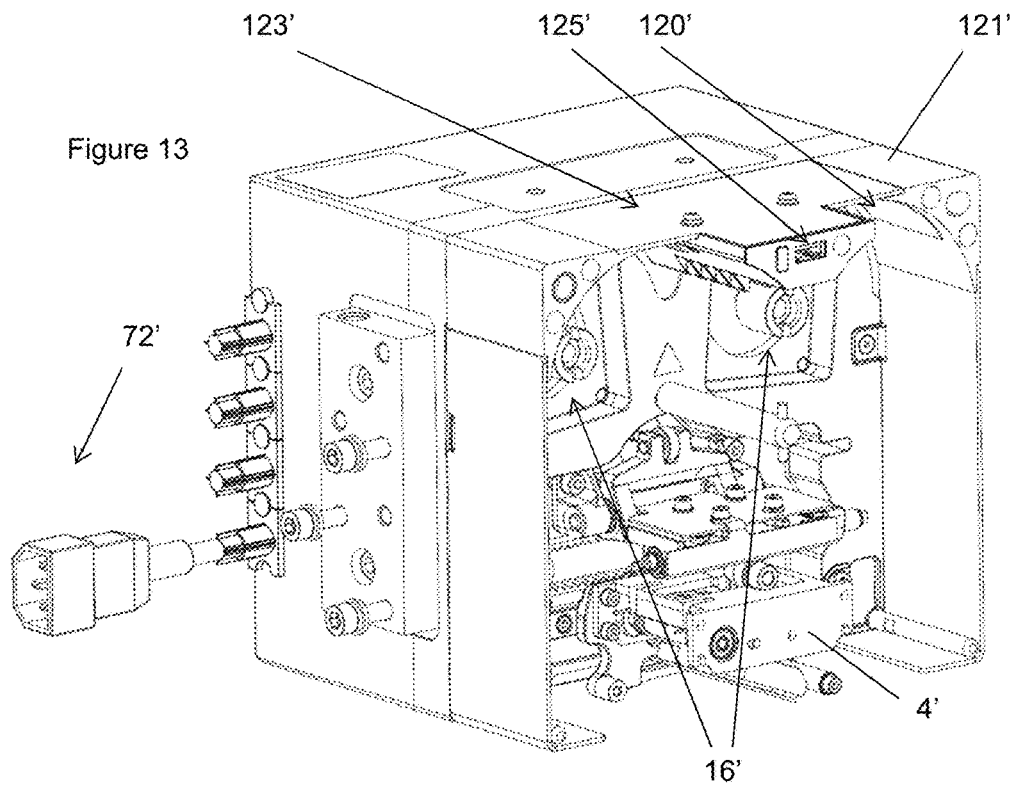
FIG. 13 is another perspective view of a printing apparatus shown with the cassette removed.
Figure 14:
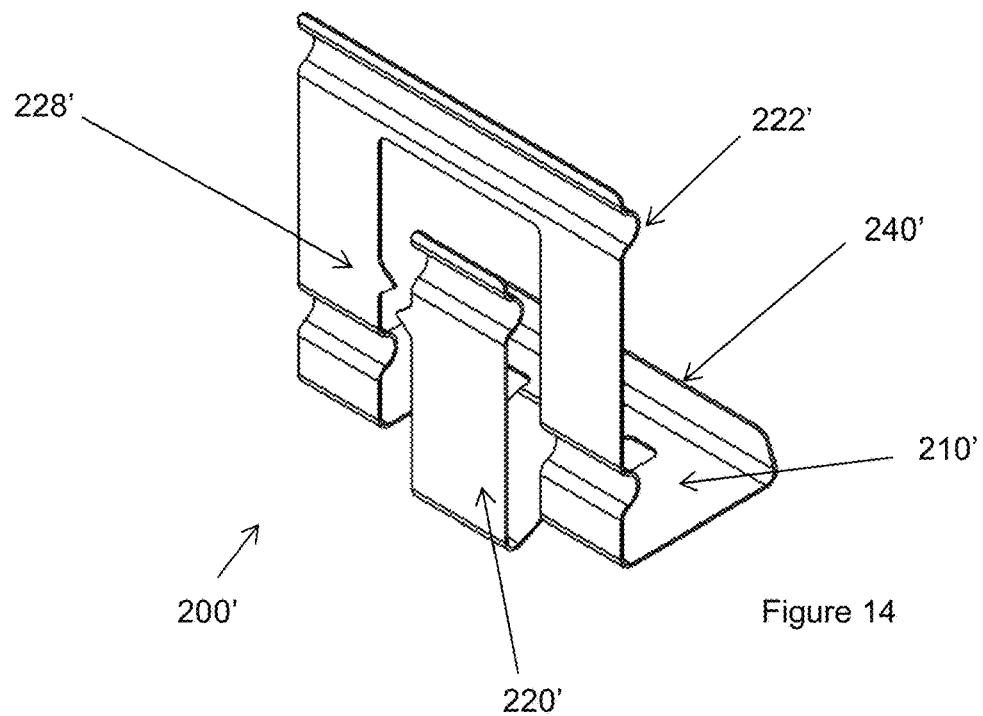
FIG. 14 is a perspective view of a tool in accordance with some embodiments.
Figure 15:
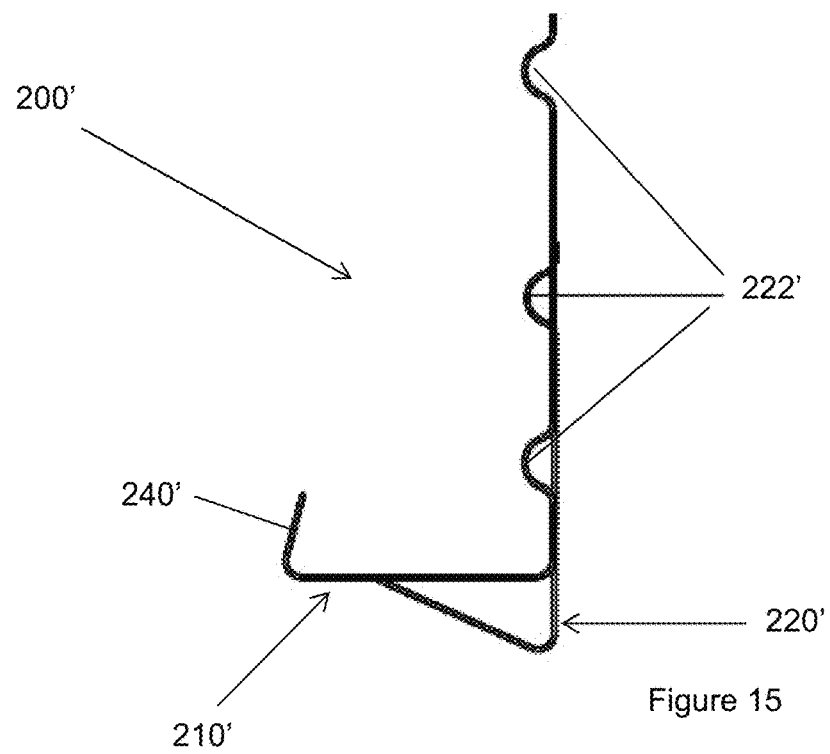
FIG. 15 is a side view of the tool of FIG. 14.
Figures 18A, 18B:
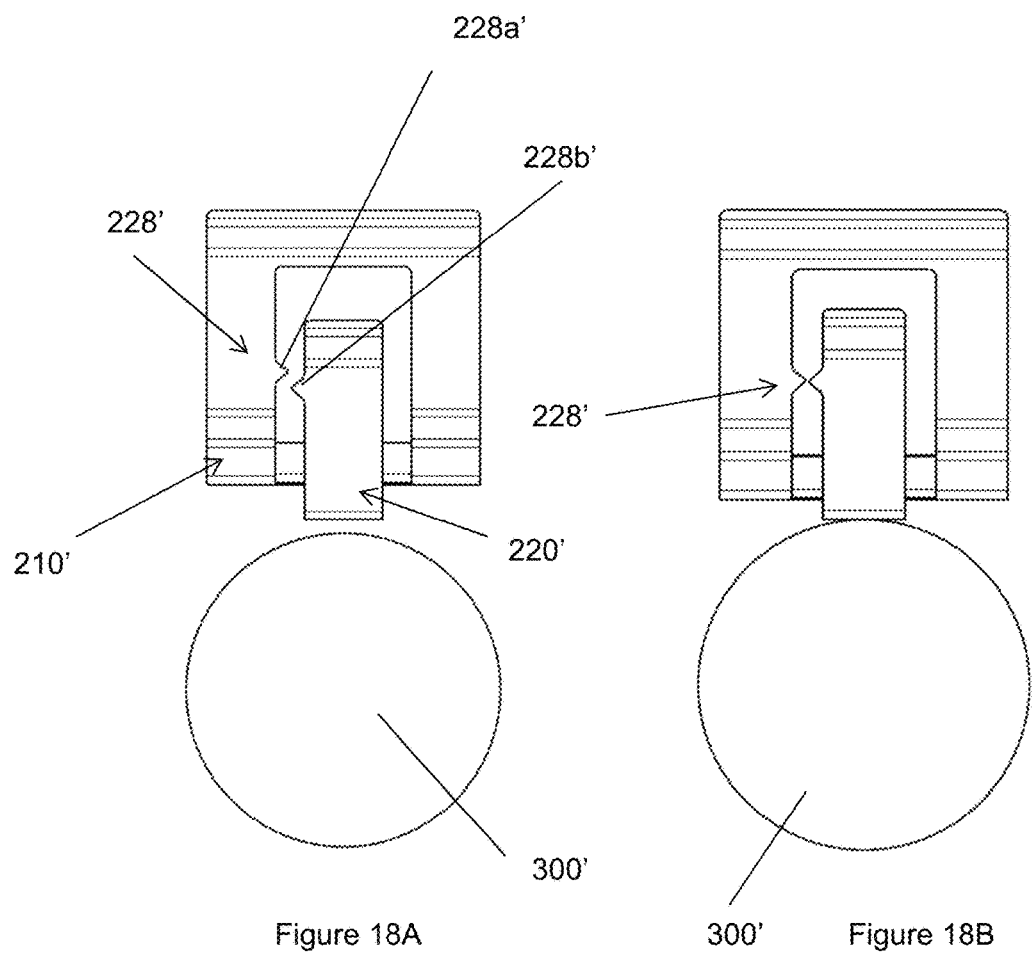
FIGS. 18A and 18B illustrate a method of using the tool in accordance with some embodiments.

Referring to FIGS. 11 to 13, the ribbon identification system comprises a reader 120'.

The tag 100' may be associated with one of the supply spool 2' and the take-up spool 3'. The tag 100' contains information about the ribbon 5' (e.g. ribbon type/ribbon dimension) which is wound on to the spool 2', 3' to which the tag 100' is attached. In some embodiments, the tag 100' may be fitted to a plastics core 104'. Advantageously, the plastics core 104' may be easily fitted to one of the supply or take-up spools 2', 3' and/or the plastics core 104' may be used as a central spindle on which ribbon 5' is wound (either before any operation of the printing apparatus if the supply spool 2' is used, or during operation if the take-up spool 3' is used).

In some embodiments, the ribbon identification system may include a tag 100' that is either "passive", "active" or "battery-assisted passive". In embodiments, a passive tag 100' is preferred because it does not require a battery and is, hence, cheaper and smaller than an active or battery-assisted passive tag. Passive tags 100' use a signal (energy) transmitted by the reader 120' to power the tag 100' and reflect a modulated signal (including the information) back to the reader 120'.

The reader 120' is attached to the removable portion. The signal emitted by the tag 100' received by the reader 120' allows the reader 120' to identify a property of the ribbon 5'. In other words, the purpose of the ribbon identification system is to inform the printing apparatus 10' of the type of ribbon 5' that has been fitted thereto. A printing apparatus 10' requires information concerning the ribbon type so that it can appropriately advance the ribbon 5' past a printhead 4'. For instance, the printing apparatus 10' requires the precise width of a ribbon 5', so that it can ensure that the printed image fits onto the ribbon 5'. The printing apparatus 10' can also use information concerning the ribbon type to ensure that the heat settings of the printhead 4' are correctly matched to the ink on the ribbon 5'. Therefore, the printing apparatus 10' is fitted with the ribbon identification system so as to identify the type of ribbon 5' that has been inserted into the printing apparatus 10'.

The reader 120' is required to allow the printing apparatus 10' to read the information from the tag 100'. The reader 120' is positioned so there is maximum electromagnetic coupling between the reader 120' and the tag 100' (i.e. the reader 120' must be positioned close enough to the tag 100' to be able to detect a signal from the tag 100') that it is reading whilst at the same time giving sufficient mechanical clearance for the ribbon 5' to be fitted.

In some embodiments, the or each removable portion may be formed from a plastics material. In some embodiments, the housing 20' may include a collar 32' which defines an opening for receiving the cassette 14' containing the supply spool 2' and the take-up spool 3'.

In some embodiments, the or each removable portion may include a corner part 121', e.g. a corner part 121' of the collar 32'. In some embodiments, the reader 120' may be housed on or within the corner part 121'. In some embodiments, the reader 120' may be at least partially embedded in the corner part 121'. In some embodiments, the reader 120' may be fully embedded in the corner part 121'.

It is advantageous to use a plastics material in (or on) which the reader 120' is positioned, since this material reflects less signal when compared to other materials such as metal. Thus, the plastics material of the corner part 121' will interfere less with the operation of the ribbon identification system than a metal corner part 121'. The remainder of the collar 32' may be formed from metal, since metal provides the housing 20' with strength and rigidity.

In some embodiments, however, the collar 32' and the or each corner part 121' may be formed from a plastics material.

FIGS. 11 and 13 show the form of the printing apparatus 10' when one of the corner parts 121' has been fitted with the reader 120'.

In some embodiments, the housing 20' may include an adaptor 123'. The adaptor 123' may include a connector 124' which is configured to be electronically connected to the reader 120'. In some embodiments, the adaptor 123' may be positioned at an upper portion of the housing 20' between two corner parts 121'. In some embodiments, the adaptor 123' may include two or more connectors 124' which are each configured to be electronically connected to the reader 120'. In embodiments where there are two connectors 124', the connectors 124' may be located on opposing sides of the adaptor 123' to one another. The opposing sides of the adaptor 123' may face respective corner parts 121'.

In some embodiments, the adaptor 123' may include a further connector 125' which allows the adaptor 123' to be connected to an outside network. The further connector 125' may be, for example, a USB connection socket or Ethernet socket. The further connector 125' allows the printing apparatus 10' to be connected to another device which may receive information from the printing apparatus 10' (for example, about the types of ribbon 5' being used). The printing apparatus 10' may also receive information from the outside device (for example, running instructions, software updates, etc.).

The arrangement of the invention is advantageous, in that it provides the printing system with additional flexibility making the system easier to use. The core 104' having the tag 100' mounted thereto can be fitted to either spool support during use and the reader 120' can be located (and connected) in the appropriate corner of the housing 20', so that the maximum signal can be received from the tag 100'. Because the corner parts 121' are removable they can be switched easily in the event that tag 100' has been switched from, for example, the supply spool 2' to the take-up spool 3'. Additionally, if the reader 120' breaks then the corner part 121' on which the reader 120' is located can be removed for repair or replacement. For example, a new corner part 121' (having new reader 120' attached thereto) can be easily fitted.

Referring to FIGS. 14 to 18, there is shown a tool 200' for setting a predetermined distance between a printing apparatus 10' and a surface 300', the tool 200' comprising a first part 210', a second part 220' for contacting the surface 300' and an indicator assembly 228' for indicating when a predetermined distance between the printing apparatus 10' and the surface 300' has been set. In use, the second part 220' is configured to move relative to the first part 210' such that the indicator assembly 228' indicates when the predetermined distance has been set.

It is desirable to accurately locate a printing apparatus 10' a predetermined distance away from the surface 300' to which a substrate to be printed is supported. The surface 300' may be, for example, a platen roller, a pad or any other support known in the art. Setting the printing apparatus 10' a predetermined distance from the surface 300' allows the print quality to be maximised. The tool 200' of the present invention also allows a user to set the predetermined distance consistently time and time again. The predetermined distance may be 2 mm.

In some embodiments, the indicator assembly 228' may include a first measurement device 228a' associated with the first part 210' and a second measurement device 228b' associated with the second part 220'.

In some embodiments, the second part 220' may be resiliently biased, such that the tool 200' is configured to adopt a first configuration (shown in FIG. 18A) in which the distance between the first measurement device 228a' and the second measurement device 228b' corresponds to the predetermined distance.

In some embodiments, the second part 220' may be movable to overcome the resilient biasing, such that the tool 200' is configured to adopt a second configuration (shown in FIG. 18B) in which the distance between the first measurement device 228a' and the second measurement device 228b' indicates that the predetermined distance has been set.

In some embodiments, the tool 200' may include an attachment mechanism 240' for attaching or releasably attaching the tool 200' to a printing apparatus 10'.

In some embodiments, the attachment mechanism 240' may include a snap-fit connector. The attachment mechanism 240' may include a cassette receiving part which is configured to receive an edge 14a' of a cassette of the printing apparatus 10'.

In some embodiments, the tool 200' may include one or more protrusions 222' which, in use, face towards the printing apparatus 10'. Advantageously, the or each protrusion 222' assists in providing a tight fit between the tool 200' and the printing apparatus 10'.

In some embodiments, the tool 200' may be substantially L-shaped such that it can fit around the edge 14a' of the printing apparatus 10'.

In some embodiments, the invention may relate to a printing system (not shown) including a tool 200' as described herein, a printing apparatus 10' and a surface 300', wherein the printing apparatus 10' is locatable adjacent the first part 210' of the tool 200 and the second part 220' of the tool 200' is contactable with the surface 300'.

In some embodiments, the printing apparatus 10' may be a thermal transfer overprinter.

In use, the method of using the tool 200' includes the following steps. In some embodiments, the tool 200' may be fitted to the printing apparatus 10', for example the housing 20' or an edge 14a' (see FIGS. 16 and 17) of the second component part 14'. The second component part 14' may be connected to the first component part 12' with the tool 200' attached to the edge 14a' (the printing apparatus 10' may be switched off, so that it cannot be operated while installation is in progress). The printing apparatus 10' is moved towards the surface 300' until the second part 220' contacts the surface 300' (see FIG. 18A). The printing apparatus 10' is moved further towards the surface 300' until the first and second measurement devices 228a',228b' align (see FIG. 18B). The printing apparatus 10' is held in place relative to the surface 300' while the printing apparatus 10' and/or the surface 300' are fixed (i.e. using screws or tightening brackets, or other fixing means, etc.).

An advantage of using the tool 200' means that the installation of the printing apparatus 10' relative to the surface 300' is always consistent. If an engineer needs to move the printing apparatus 10' or surface 300' for any reason (for example, servicing or cleaning) then it is a straightforward method to reset the distance between the printing apparatus 10' and surface 300' after the intervention is complete.

Additionally, including a tool 200' for setting the distance between the printing apparatus 10' and the surface 300' reduces the need for specialist installers—which results in the printing apparatus 10' being cheaper to buy and run.

Another advantage is that when the distance between the printing apparatus 10' and the surface 300' is set to a predetermined distance then the printing apparatus 10' can be configured to provide all printer settings relative to that predetermined distance, thus making operation and running of the printing apparatus 10' easier (for example, software for a controller which controls the printing apparatus 10' may be specifically programmed to run from a 2 mm distance). Additionally, the predetermined distance may improve print quality and energy consumption and/or reduce thermal waste (for example, the system may produce less heat) and/or reduce the impact between the printing apparatus 10' and other components of the system (particularly those operating adjacent the printing apparatus 10').

It should be appreciated that all of the features described in the above description may be combined with one another to make any combination of features. None of the described embodiments is co-dependent on any other feature described.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A printing system comprising a printing apparatus and a ribbon identification system, the printing apparatus comprising:
   a housing which includes at least one removable portion;
   a pair of spool supports which are rotatably drivable by at least one motor;
   a supply spool, upon which ribbon is initially wound;
   a take-up spool, for receiving ribbon unwound from the supply spool, each spool being receivable on a respective spool support, such that, in use, the ribbon extends along a ribbon path between the supply spool and the take-up spool;

the ribbon identification system comprising:
   a tag for storing information concerning a property of the ribbon;
   a reader;
   wherein the tag is attached to one of the supply and take-up spools and the reader is attached to at least one of the at least one removable portion, and wherein a signal emitted by the tag and received by the reader allows the reader to identify a property of the ribbon.

2. A printing system according to claim 1, wherein the tag is passive.

3. A printing system according to claim 2, wherein the at least one removable portion is formed from a plastics material.

4. A printing system according to claim 1, wherein the housing includes a collar which defines an opening for receiving the supply spool and the take-up spool.

5. A printing system according to claim 4, wherein the at least one removable portion includes a corner part of the collar.

6. A printing system according to claim 5, wherein the reader is housed on or within the corner part.

7. A printing system according to claim 6, wherein the reader is at least partially embedded in the corner part.

8. A printing system according to claim 1, wherein the housing further comprises an adaptor.

9. A printing system according to claim 8, wherein the adaptor includes a connector configured to be electronically connected to the reader.

10. A printing system according to claim 9, wherein the adaptor includes two or more connectors, wherein each connector is configured to be electronically connected to the reader.

11. A printing system according to claim 1, wherein the printing apparatus is a thermal transfer overprinter.

\* \* \* \* \*